Patented Oct. 6, 1953

2,654,775

UNITED STATES PATENT OFFICE 2,654,775

2,2-DIMETHYLPROPANEDIOL-1,3 DI-(2-ETHYLHEXANOATE)

Alan Bell and Benjamin Thompson, Kingsport, Tenn., assignors to Eastman Kodak Company, Rochester, N. Y., a corporation of New Jersey No Drawing. Application September 17, 1949, Serial No. 116,412

1 Claim. (Cl. 260—488)

This invention relates to new chemical compounds, and more particularly to certain esters of 2,2-dimethyl propanediol-1,3, specifically the di-(2-ethyl butyric) and di-(2-ethyl hexanoic) esters,

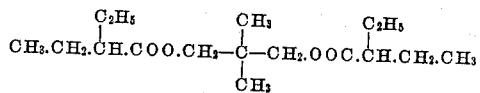

and

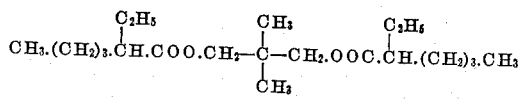

We have prepared these esters as follows:

*Example 1—Di-(2-ethyl butyrate) of 2,2-dimethyl propanediol-1,3.*—208 grams of 2,2-dimethyl propanediol-1,3 and 580 grams of 2-ethyl-butyric acid were heated together at 200–240° C. for 12 hours, the water formed being collected by means of an automatic decanting reflux condenser. 72 grams of water was collected. The solution remaining in the reaction vessel was cooled, washed with dilute sodium carbonate, dried over sodium sulfate, and vacuum distilled. 500 grams of the di-(2-ethyl butyrate) of 2,2-dimethyl propanediol-1,3 was obtained. The ester had a boiling point of 65–70° C./100 mm., and a refractive index $n_D^{20}$ 1.4340.

*Example 2—Di-(2-ethyl hexanoate) of 2,2-dimethyl propanediol-1,3.*—193.5 grams of 2,2-dimethyl propanediol-1,3 and 694 grams of 2-ethyl-hexanoic acid were heated together for 12 hours at 210–270° C., the water formed being collected by means of an automatic decanting reflux condenser. 72 grams of water was collected. The solution remaining in the reaction vessel was cooled, washed with dilute sodium carbonate, dried over sodium sulfate, and vacuum distilled. 600 grams of the di-(2-ethyl-hexanoate) of 2,2-dimethyl propanediol-1,3 was obtained. The ester had a boiling point of 75° C./1–2 mm., and a refractive index $n_D^{20}$ 1.4398.

Our novel esters are useful as plasticizers for cellulose organic acid esters, particularly cellulose acetate-butyrate and cellulose acetate-propionate. They can be compounded with the cellulose esters by rolling on hot rolls, or by the solvent method. Cellulose organic acid ester plastics containing them show good permanence properties (low gain on immersion in water, low leaching, and low loss on heating), and stable heat test flows.

What we claim as our invention and desire to be secured by Letters Patent of the United States is:

Di-(2-ethyl-hexanoate) of 2,2-dimethyl propanediol-1,3, having the formula

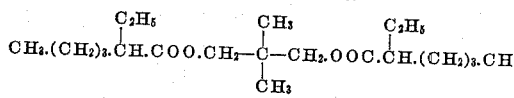

ALAN BELL.
BENJAMIN THOMPSON.

References Cited in the file of this patent

UNITED STATES PATENTS

| Number | Name | Date |
|---|---|---|
| 2,229,222 | Reid | Jan. 21, 1941 |
| 2,336,223 | Coleman et al. | Dec. 7, 1943 |

OTHER REFERENCES

Chem. Abstracts, vol. 41, p. 3580–h (1947).
Beilstein: "Handbuch der organischen Chemie" (4th ed.) vol. 1, p. 483.